United States Patent [19]

Sato

[11] Patent Number: 6,043,902

[45] Date of Patent: *Mar. 28, 2000

[54] COMMUNICATION APPARATUS AND METHOD

[75] Inventor: Hiroyuki Sato, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/636,334

[22] Filed: Apr. 23, 1996

[30] Foreign Application Priority Data

Apr. 25, 1995 [JP] Japan ................................. 7-099315

[51] Int. Cl.⁷ ..................................................... H04N 1/00
[52] U.S. Cl. ........................... 358/434; 358/405; 358/407; 358/438; 358/442; 379/100.09; 379/100.12
[58] Field of Search ..................................... 358/400, 401, 358/405, 407, 434, 435, 436, 438, 439, 442; 379/100.06, 100.09, 100.12, 100.14, 102.01, 102.02, 156, 219, 220, 225, 231, 232, 233

[56] References Cited

U.S. PATENT DOCUMENTS

| | | | |
|---|---|---|---|
| 5,267,047 | 11/1993 | Argenta et al. | 358/400 |
| 5,291,302 | 3/1994 | Gordon et al. | 358/400 |
| 5,400,335 | 3/1995 | Yamada | 370/94.1 |
| 5,481,249 | 1/1996 | Sato | 340/825.06 |
| 5,642,352 | 6/1997 | Ishida et al. | 370/401 |

*Primary Examiner*—Jerome Grant, II
*Attorney, Agent, or Firm*—Fitzpatrick, Cella, Harper & Scinto

[57] ABSTRACT

When a communication apparatus determines that a LAN terminal designated by a transmitting facsimile machine has not logged on to the LAN, the communication apparatus sends a transfer result error back to the facsimile machine and sends the facsimile machine an inquiry as to what measures should be taken subsequently. Depending upon the response to the inquiry, either notification of the incoming call from the facsimile machine is transferred to a proxy user who has logged on to the LAN or it is determined, at fixed time intervals, whether the designated terminal or proxy user has logged on. If log-on can be confirmed, notification of the incoming call is transferred to or printed out. If log-on cannot be confirmed, the received data are erased. Refusal of an incoming call can thus be avoided even if the designated communication terminal on the LAN has not logged on.

22 Claims, 10 Drawing Sheets

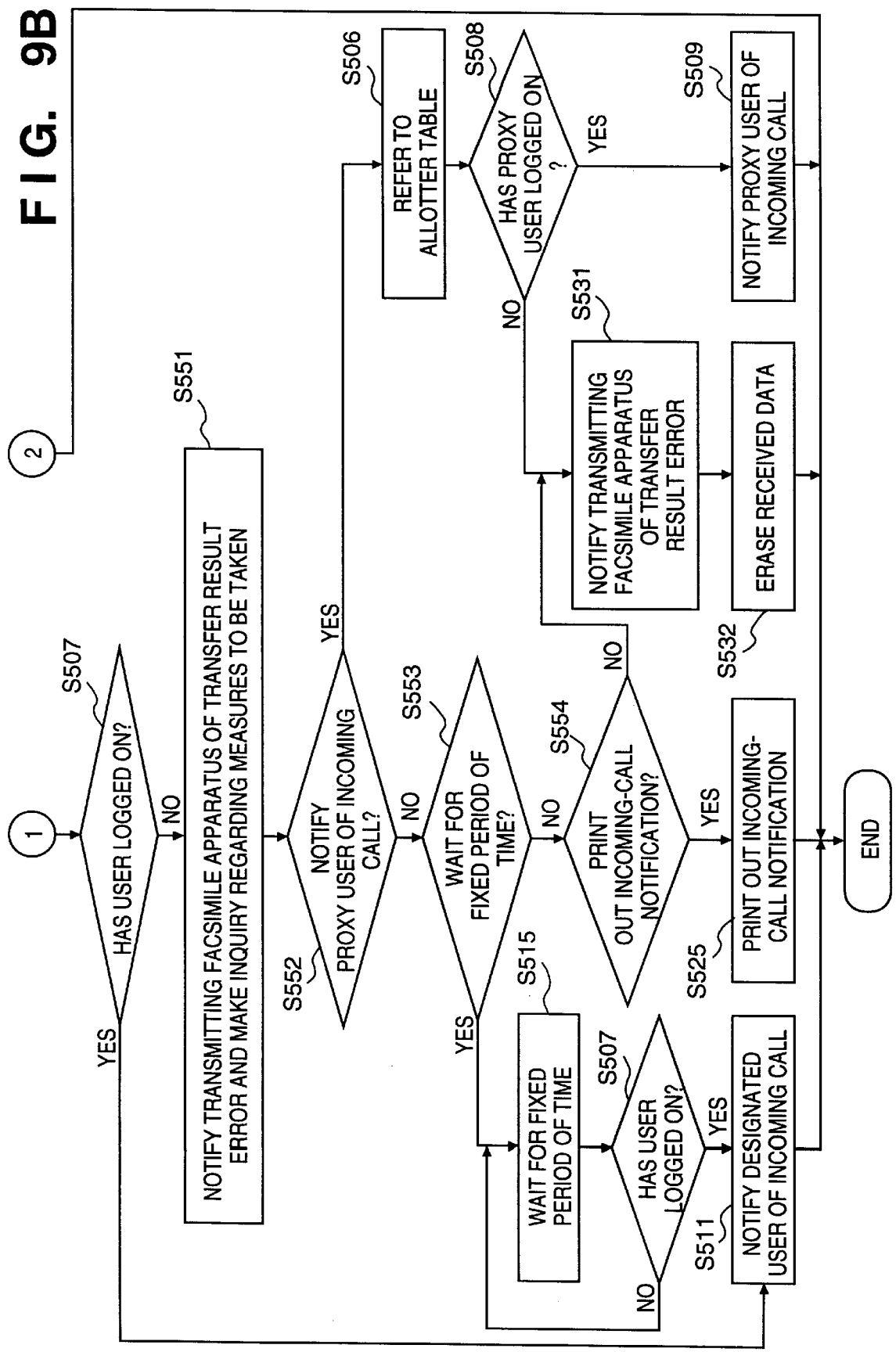

COMMUNICATION APPARATUS AND METHOD

BACKGROUND OF THE INVENTION

This invention relates to a communication apparatus, such as a facsimile machine, having a LAN interface, and to a communication method associated with the apparatus.

When incoming facsimile data from an outside line are terminated at a prior-art facsimile apparatus having a LAN interface, users on the LAN are not notified of the incoming call. If a system is adopted in which limited notification of incoming data is given, absolutely no judgment is made as to whether a terminal that is to be notified has logged on to the LAN. Even if such a judgment is made, appropriate measures are not taken in a case where the terminal is found not to have logged on.

When there is an incoming call to the abovementioned conventional facsimile apparatus and the call includes an "incoming-call notification indication" to a user who is supposed to be logged on to LAN, either the incoming call is refused or the apparatus continues to accept the call, with attendant filling of its internal memory, if the user has not actually logged on. In either case, the result is inconvenience as far as the user is concerned.

SUMMARY OF THE INVENTION

Accordingly, an object of the present invention is to provide a communication apparatus and method in which refusal of an incoming call can be avoided even if a communication terminal on a LAN has not logged on, and in which the confidentiality of a communication can be maintained.

Another object of the present invention is to provide a communication apparatus and method through which the internal memory of the communication apparatus can be utilized effectively.

According to the present invention, the foregoing objects are attained by providing a communication apparatus connected to a local area network having a plurality of communication terminals, the apparatus comprising means for judging whether there is an incoming-call notification indication to a communication terminal on the local area network; means for performing a search to determine whether the communication terminal has logged on to the local area network in a case where it has been judged that there is an incoming-call notification indication; and means for making an inquiry of origin of transmission of the incoming-call notification indication, the inquiry being an inquiry for a measure to be taken if the communication terminal has not logged on.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 9A and 9B are flowcharts showing a reception control procedure according to a second embodiment of the invention.

DESCRIPTION OF THE PREFERRED EMBODIMENTS

Preferred embodiments of the present invention will now be described with reference to the accompanying drawings.

[First Embodiment]

Figure 1:
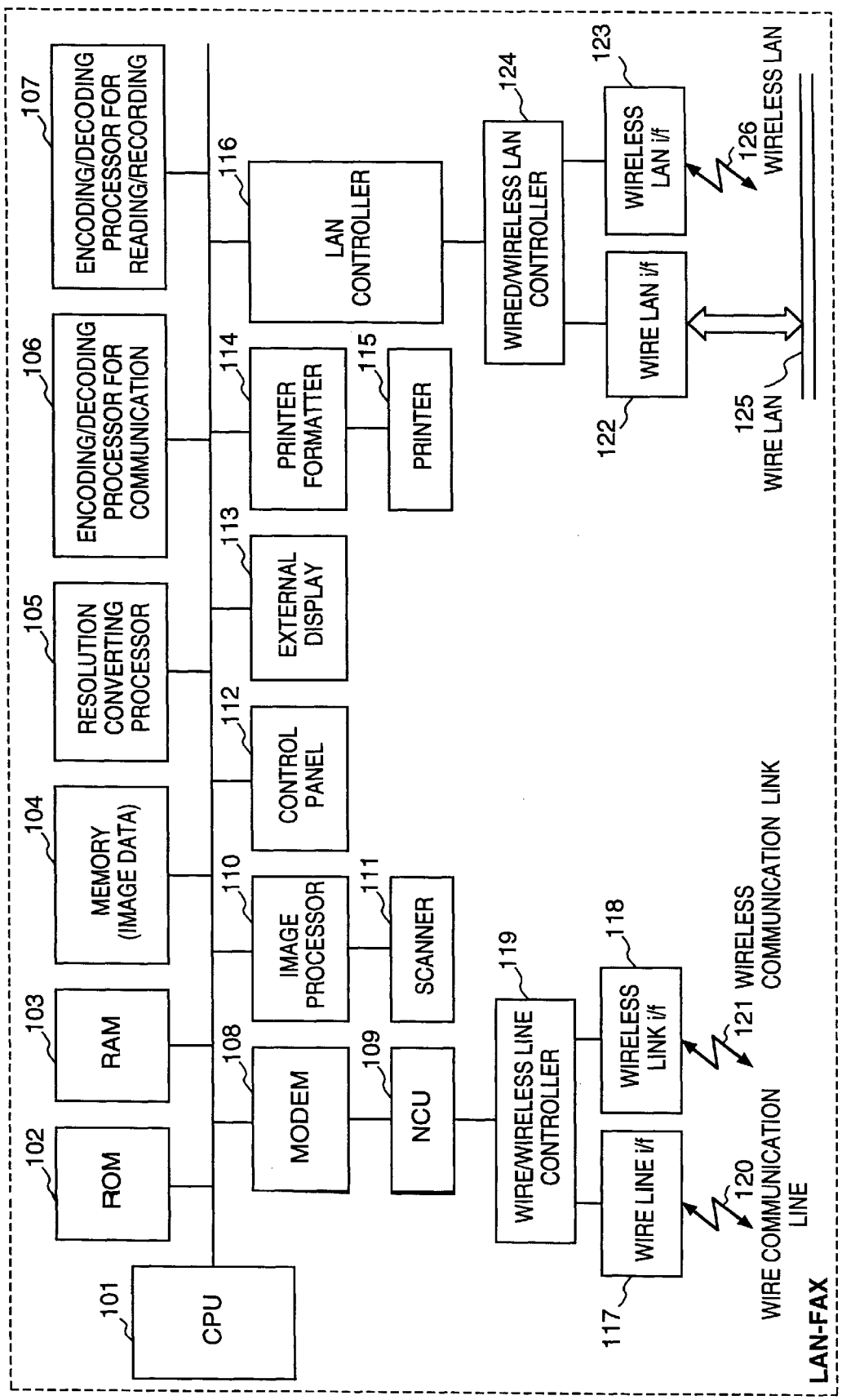
FIG. 1 is a block diagram illustrating the construction of a facsimile apparatus according to a first embodiment of the present invention.

FIG. 1 is a block diagram illustrating the construction of a facsimile apparatus according to a first embodiment of the present invention. The apparatus includes a CPU 101 serving as a system controller for controlling the overall facsimile apparatus, a ROM 102 for storing the control program of the CPU 101, and a RAM 103 comprising an SRAM or the like for storing control program variables and the like. The RAM 103 may also function as a working buffer RAM for storing set values registered by the operator as well as data for managing the apparatus. A memory 104 comprises a DRAM or the like and stores image data.

A resolution converting processor 105 controls the resolution conversion, such as a millimeter-to-inch conversion, of raster data, and an encoding/decoding processor 106 for communication performs encoding for communication purposes in a case where the encoding method at the time of reading and at the time of recording differs from that at the time of communication. An encoding/decoding processor 107 for reading/recording executes processing for encoding and decoding image data at the time of reading and at the time of recording. A modem 108 modulates and demodulates a facsimile reception signal.

An NCU (network control unit) 109 sends a communicating-party selection signal (dial pulses or a multi-frequency tone signal) to a wire communication line 120 via a wire line interface (i/f) 117 or to a wireless communication line 121 via a wireless link interface (i/f) 118. Further, the NCU 109 performs an automatic call terminating operation based upon detection of a ringing signal from the wire communication line 120 or wireless communication link 121. A wire/wireless line controller 119 controls the wire line i/f 117 and wireless link i/f 118.

A scanner 111 comprises, say, a CS image sensor and a document conveyance mechanism, etc., for optically reading an image on a document and converting the read image to an electric signal indicative of image data. An image processor 110 applies correction processing to the image data read by the scanner 111 and outputs high-definition image data. A control panel 112, which comprises a keyboard (not shown) or the like, allows the operator to perform various input operations. An external display unit 113, which comprises an LCD or LED panel or the like, displays prescribed information for the user.

A printer formatter 114 analyzes the printer description language when file data from a work station or the like are printed, and converts the file data to image data. A printer 115 records a received image and file data on recording paper. A wired LAN interface (i/f) 122 connects a facsimile apparatus to a wired LAN 125, and a wireless LAN interface (i/f) 123 connects a facsimile apparatus to a wireless LAN 126. The wired LAN i/f 122 and wireless LAN i/f 123 are controlled by a wired/wireless LAN controller 124. A LAN controller 116 performs data processing for sending data to and receiving data from a server or terminal (not shown) on the wired LAN 125 or wireless LAN 126.

Figure 2:
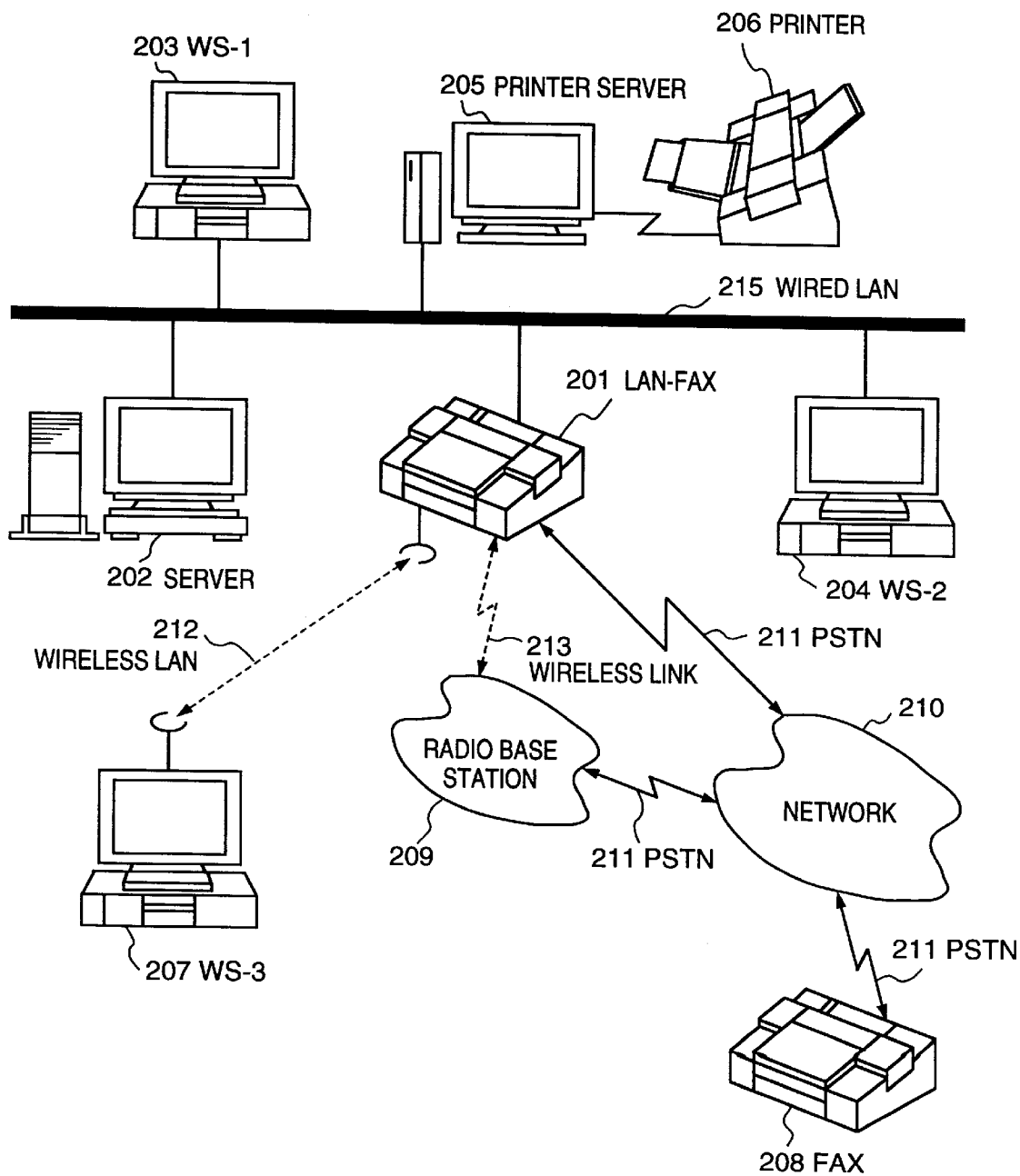
FIG. 2 is a diagram showing the connections to a system which includes a facsimile apparatus according to the first embodiment.

FIG. 2 is a diagram showing the connections to a LAN system which includes the facsimile apparatus according to the first embodiment of the invention.

As shown in FIG. 2, a facsimile apparatus (LAN-FAX) 201 according to this embodiment is a facsimile apparatus capable of being connected directly to a wired LAN 215 and to a wireless LAN 212. In this embodiment, an example is illustrated in which the facsimile apparatus is connected to a LAN, However, the invention is not limited to this arrangement.

A server 202 of the LAN to which the facsimile apparatus of this embodiment is connected administers the LAN as well as the files on the LAN. Client machines WS-1 (203) and WS-2 (204), which are information processing terminals, are connected to the wired LAN 215. A printer server 205 accepts print requests from the client machines and controls outputs to the a printer 206. The printer 206 outputs print image data.

A client machine WS-3 (207) is connected to the wireless LAN 212. Numeral 208 denotes the facsimile apparatus of a communicating party. This apparatus is capable of communicating with the facsimile apparatus of this embodiment through a telephone line, described later. A radio base station 209 allows the facsimile apparatus of this embodiment to communicate with the facsimile apparatus 208 via a wireless link 213.

Numeral 210 denotes a line network to which the facsimile apparatus 208 and radio base station 209 are connected via a public switched telephone network (PSTN) 211. The wireless LAN 212 is constituted by facsimile apparatuses and client machines that have wireless LAN interfaces. The wireless link 213 connects the facsimile apparatus 201 with the radio base station 209 via a wireless link interface.

Figure 3:
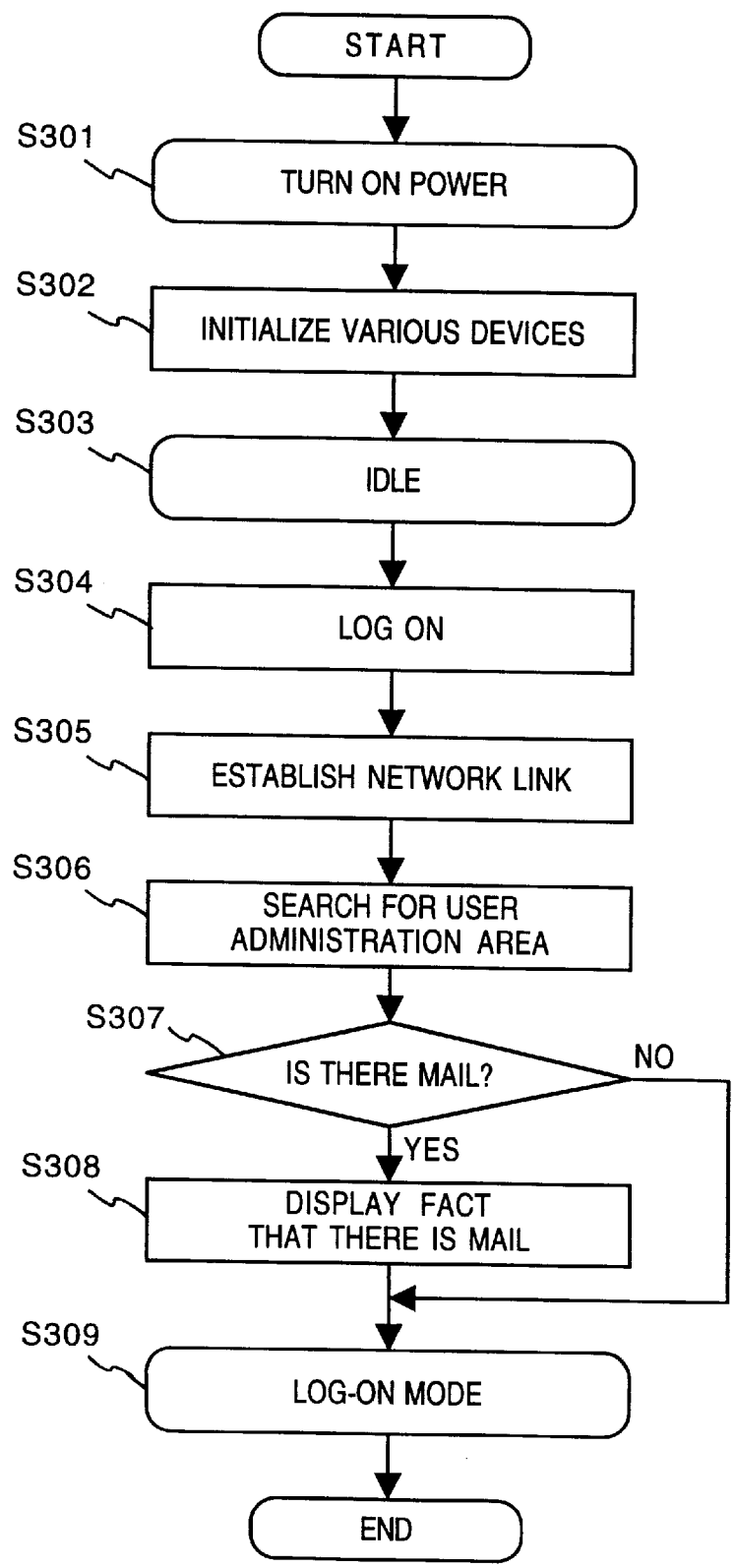
FIG. 3 is a flowchart illustrating a processing procedure executed after power is introduced to an ordinary network terminal.

FIG. 3 is a flowchart illustrating a processing procedure executed after power is introduced to an ordinary network terminal. More specifically, this is a flowchart illustrating a procedure executed when the client machines (information processing terminals) 203, 204 shown in FIG. 2 are started up.

When power is introduced to a terminal at step S301 in FIG. 3, the hardware is initialized at step S302. Step S303 indicates that an ordinary stand-alone terminal has been started up.

In order for a terminal to be connected to the LAN, the following control is performed automatically or by the user: The terminal is logged on (step S304) to the particular network of the LAN to which the connection will be made. More specifically, an operation is performed for entering the user name or the name of the server administering the network to which the terminal is desired to be connected.

Next, at step S305, an initial communication operation (network link establishment) dependent upon log-on usually is performed between the terminal and the server 202. Execution of the operation of step S305 registers, in the server 202, the fact that the client machines 203, 204, etc., have logged on.

Next, an area administered for each user who logs on is searched for in the server 202 at step S306. Before the user is logged on, it is determined at step S307 whether mail or the like has been received in the user administration area. If it is determined that mail has been received, then the program proceeds to step S308. Here a display indicating that mail has arrived is presented on a display unit. The program then proceeds to a log-on mode at step S309. Here the terminal is placed in an operable state as a stand-alone terminal or as network terminal.

Figure 4:
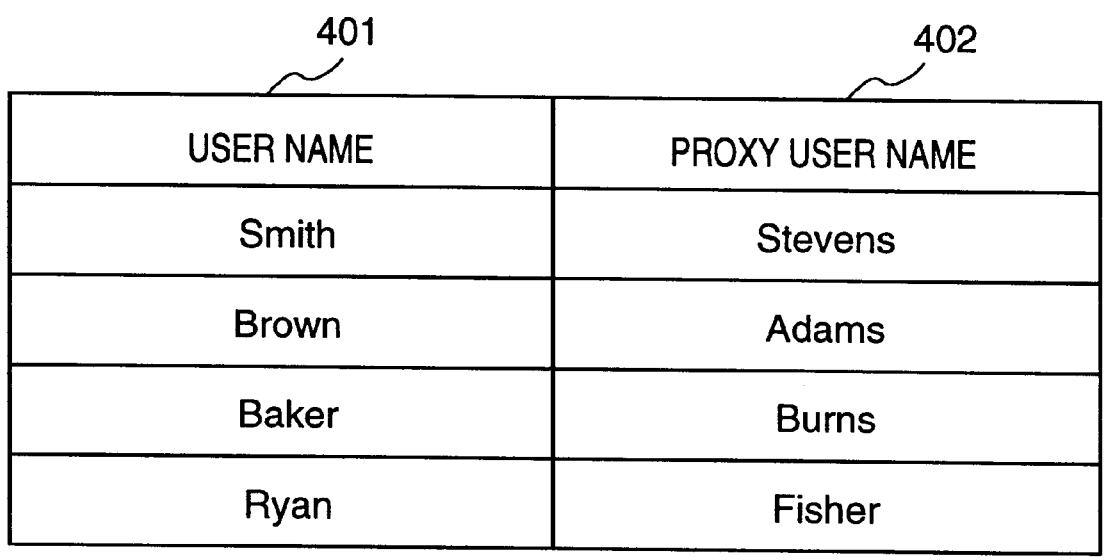
FIG. 4 is a diagram showing the content of an allotter table in a LAN-FAX according to the first embodiment.

FIG. 4 is a diagram showing the content of an allotter table in the facsimile apparatus (LAN-FAX) 201 according to the first embodiment. The allotter table shown in FIG. 4 is stored in the RAM 103 of FIG. 1. The table may have its contents rewritten at fixed time intervals or may be rewritable by the user of the LAN-FAX 201.

In FIG. 4, numeral 401 denotes the "User Name" employed when the user logs on, and numeral 402 denotes a "Proxy User Name" which, if a designated user has not yet logged on when an incoming call from a line arrives designating incoming-call notification, indicates the name of a user who will receive the incoming-call notification in place of the designated user.

Figure 5:
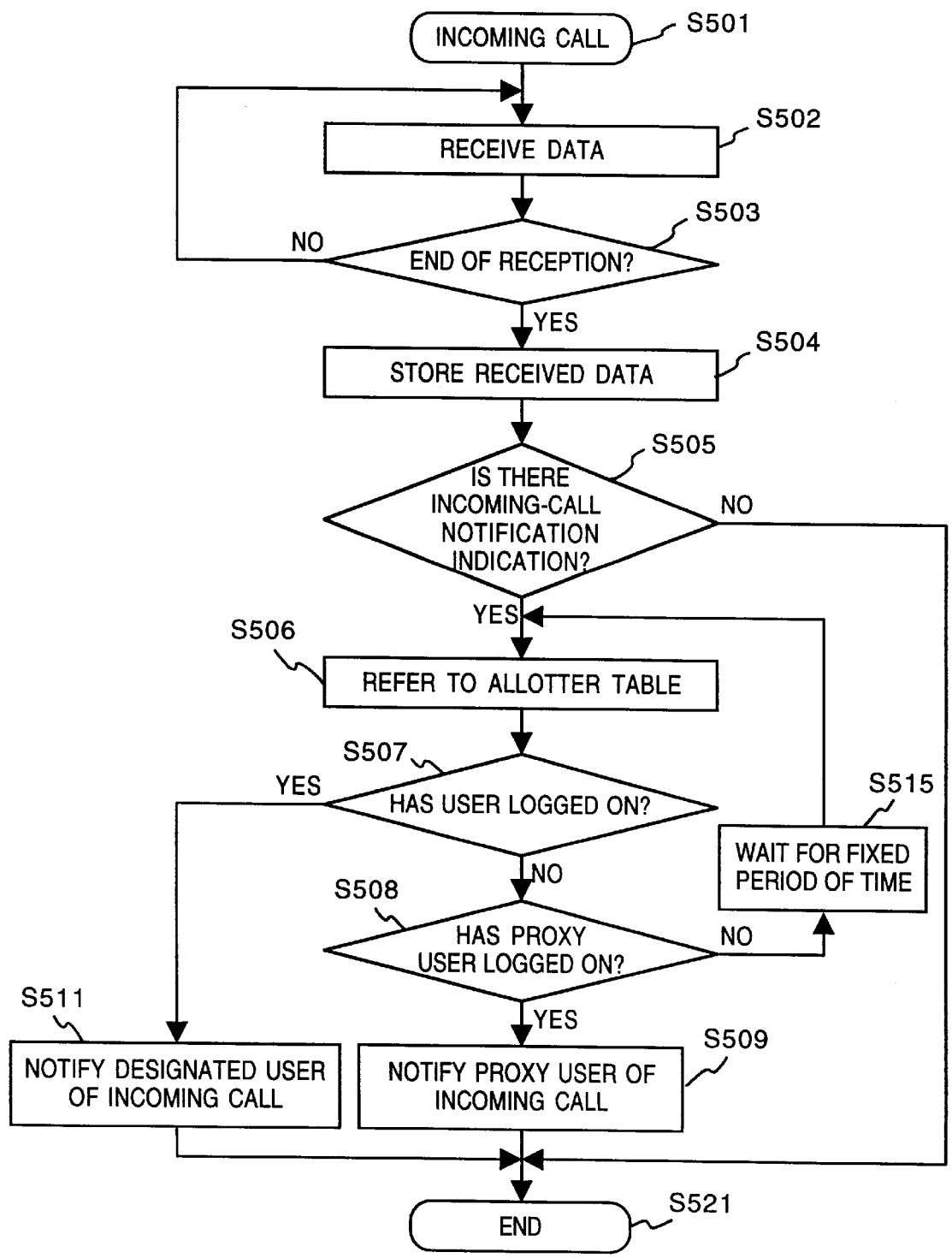
FIG. 5 is a flowchart showing a control procedure for proxy reception in a first embodiment.

FIG. 5 is a flowchart illustrating a control procedure executed in the facsimile apparatus of this embodiment when proxy reception is performed using the table shown in FIG. 4. The control procedure illustrated in FIG. 5 is proxy reception control executed when the LAN-FAX 201 has received an incoming call from the communicating facsimile apparatus 208 via the line network 210 and the like.

Step S501 in FIG. 5 indicates the fact that an incoming call has arrived. This is followed by step S502 at which image data contained in the incoming call are received, and then by step S503 at which it is determined whether data reception has ended.

If it is determined that data reception has ended ("YES" at step S503), then the program proceeds to step S504, at which the received image data are stored in the memory 104. Next, at step S505, it is determined whether an indication to the effect that notification of the incoming call is desired to be sent to a user on the LAN was received from the transmitting side at the time of data reception mentioned above. If there is no indication of the destination of the incoming-call notification ("NO" at step S505), then the program proceeds to step S521 and processing ends.

If there is an indication of the destination of an incoming-call notification ("YES" at step S505), however, then reference is made to the allotter table of FIG. 4 at step S506. This is followed by step S507, at which it is determined whether the designated user name has logged on. If the designated user name has logged on ("YES" at step S507), then the terminal at which the designated user has logged on is sent incoming-call notification mail containing a message indicating that FAX data have been received in an incoming call, e.g., a message reading "Data have been received from Mr. X" (step S511). Processing is then ended at step S521.

On the hand, if it is found at step S507 that the user designated by the communicating facsimile apparatus 208 has not logged on ("NO" at step S507), a proxy reception operation described below is executed.

By way of example, assume that the incoming call is addressed to Brown in FIG. 4 but that Brown has not logged on. In this case, the program proceeds to step S508, at which it is determined whether the proxy user shown in FIG. 4 has logged on. More specifically, if Brown has not logged on, it is determined whether Adams has logged on. If it is determined that Adams has logged on ("YES" at step S508), then the program proceeds to step S509. Here the terminal at which the proxy user Adams has logged on is sent incoming-call notification mail containing a message indicating that the FAX data have been received in the incoming call, e.g., a message reading "Data have been received from Mr. X". Processing is then terminated at step S521.

If it is determined that the proxy user has not logged on ("NO" at step S508), then the program proceeds to step S515. Here the system waits a fixed period of time, after which the processing from step S506 onward is repeated.

According to this embodiment, the arrangement is such that when a user designated as the destination of an incoming-call notification has not logged on, the notification of the incoming call is directed to the proxy user on the LAN, whereupon the proxy user may acquire the stored reception data from the facsimile apparatus. By adopting this arrangement, the memory within the facsimile apparatus is utilized more efficiently and refusal of an incoming call may be avoided. This provides greater user convenience on the transmitting side.

Further, whether a designated user or proxy user has logged on is determined at fixed time intervals. After the determination has been made, the user or proxy user may acquire the data received. This makes it possible to receive data while the security of the communication is maintained.

An arrangement may be adopted in which the allotter table (step S506 in FIG. 5) is not used. For example, an arrangement may be adopted in which it is determined at step S508 whether a specific administrator on the LAN has logged on and, if the administrator has logged on, the administrator is notified of the incoming call by proxy at step S509. Alternatively, an arrangement may be adopted in which the decision of step S508 is not rendered and notification of the incoming call is transmitted to all users on the LAN at step S509.

Further, an arrangement may be adopted in which, when the received data are stored at step S504 in FIG. 5, an ID (identifier) is applied to the received data and the ID is incorporated in the transmitted message at step S511 or step S509. This will make it easier for the user who has been notified of the incoming call to acquire the data received from the incoming call.

The above-described embodiment is capable of being modified in various ways within the scope of the claims. Modifications of the foregoing embodiment will be described with reference to the drawings.

<First Modification>

Figure 6:
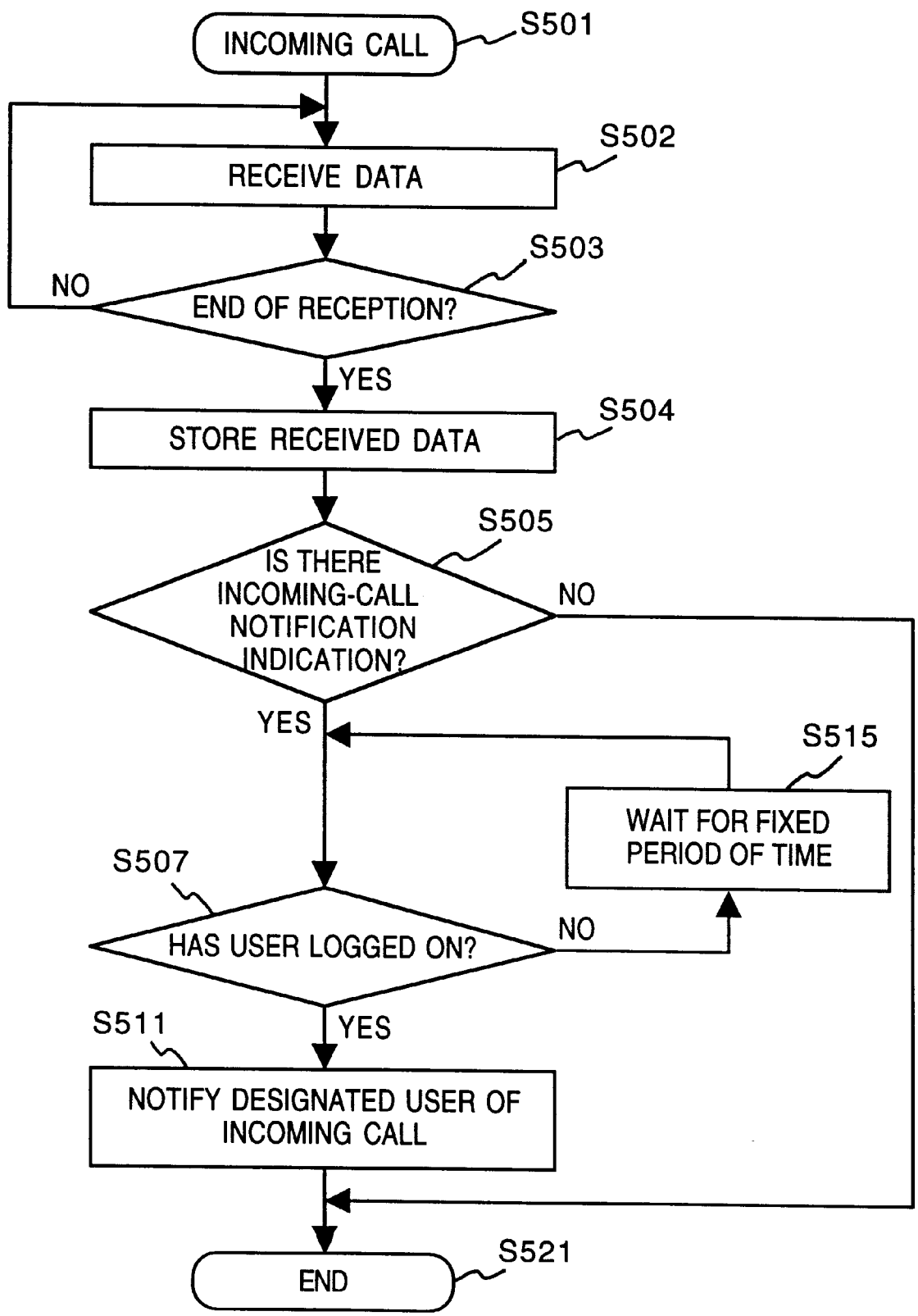
FIG. 6 is a flowchart showing a control procedure according to a first modification.

FIG. 6 is a flowchart showing a control procedure according to a first modification. This modification also illustrates a control procedure executed when an incoming call has been received from the communicating facsimile apparatus 208 via the line network 210. Steps in FIG. 6 identical with the steps shown in FIG. 5 are designated by like step numbers.

Specifically, at step S505, it is determined whether an indication to the effect that notification of the incoming call be sent to a terminal on the LAN was received from the transmitting side at the time of data reception mentioned above. If there is no indication of the destination of the incoming-call notification ("NO" at step S505), then the program proceeds to step S521 and processing ends. If there is an indication of the destination of an incoming-call notification ("YES" at step S505), however, it is determined at step S507 whether the designated user name has logged on.

If the designated user name has logged on ("YES" at step S507), then the terminal at which the designated user has logged on is sent incoming-call notification mail containing a message indicating that FAX data have been received in an incoming call, e.g., a message reading "Data have been received from Mr. X" (step S511). Processing is then ended at step S521.

If it is found at step S507 that the user designated by the communicating facsimile apparatus 208 has not logged on ("NO" at step S507), then the program proceeds to step S515. Here the system waits a fixed period of time, after which the processing from step S507 onward is repeated.

Thus, according to this modification, whether a user has logged on to the LAN is judged at fixed time intervals, and notification of an incoming call is sent at the moment the particular user logs on. As a result of this arrangement, the memory within the facsimile apparatus is utilized more efficiently and greater user convenience is provided for the transmitting side.

An arrangement may be adopted in which, when the wait processing of step S515 in FIG. 6 has been executed a number of times, this is construed as representing the elapse of a prescribed time, whereupon the received data stored in memory are printed out before processing is terminated.

<Second Modification>

Figure 7:
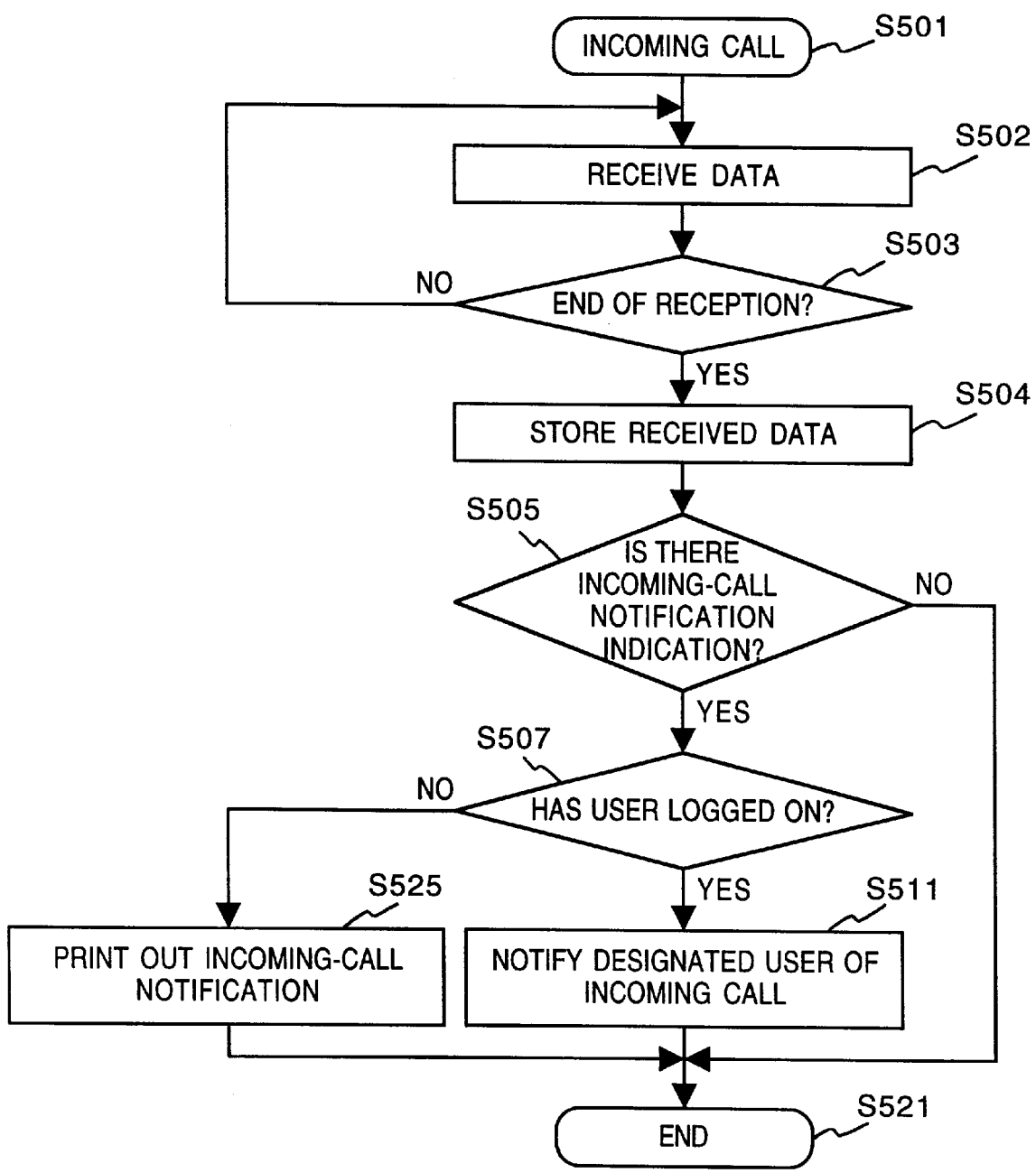
FIG. 7 is a flowchart showing a control procedure according to a second modification.

FIG. 7 is a flowchart showing a control procedure according to a second modification. This modification also illustrates a control procedure executed when an incoming call has been received from the communicating facsimile apparatus 208 via the line network 210. Steps in FIG. 7 identical with the steps shown in FIG. 5 are designated by like step numbers.

Specifically, at step S505, it is determined whether an indication to the effect that notification of the incoming call be sent to terminals on the LAN was received from the transmitting side at the time of data reception mentioned above. If there is no indication of the destination of the incoming-call notification ("NO" at step S505), then the program proceeds to step S521 and processing ends. If there is an indication of the destination of an incoming-call notification ("YES" at step S505), however, it is determined at step S507 whether the designated user name has logged on.

If the designated user name has logged on ("YES" at step S507), then the terminal at which the designated user has logged on is sent incoming-call notification mail containing a message indicating that FAX data have been received in an incoming call, e.g., a message reading "Data have been received from Mr. X" (step S511). Processing is then ended at step S521.

If it is found at step S507 that the user designated by the communicating facsimile apparatus 208 has not logged on ("NO" at step S507), then the program proceeds to step S525. Here a message, e.g., "Data have been received from Mr. X", indicating that FAX data have been received is outputted to the printer 115. Processing is then ended at step S521.

Thus, in a case where the designated user has not logged on, notification of the incoming call is printed out. As a result, refusal of an incoming call is avoided and it is possible to reliably notify the designated user of the fact that an incoming call has arrived.

<Third Modification>

Figure 8:
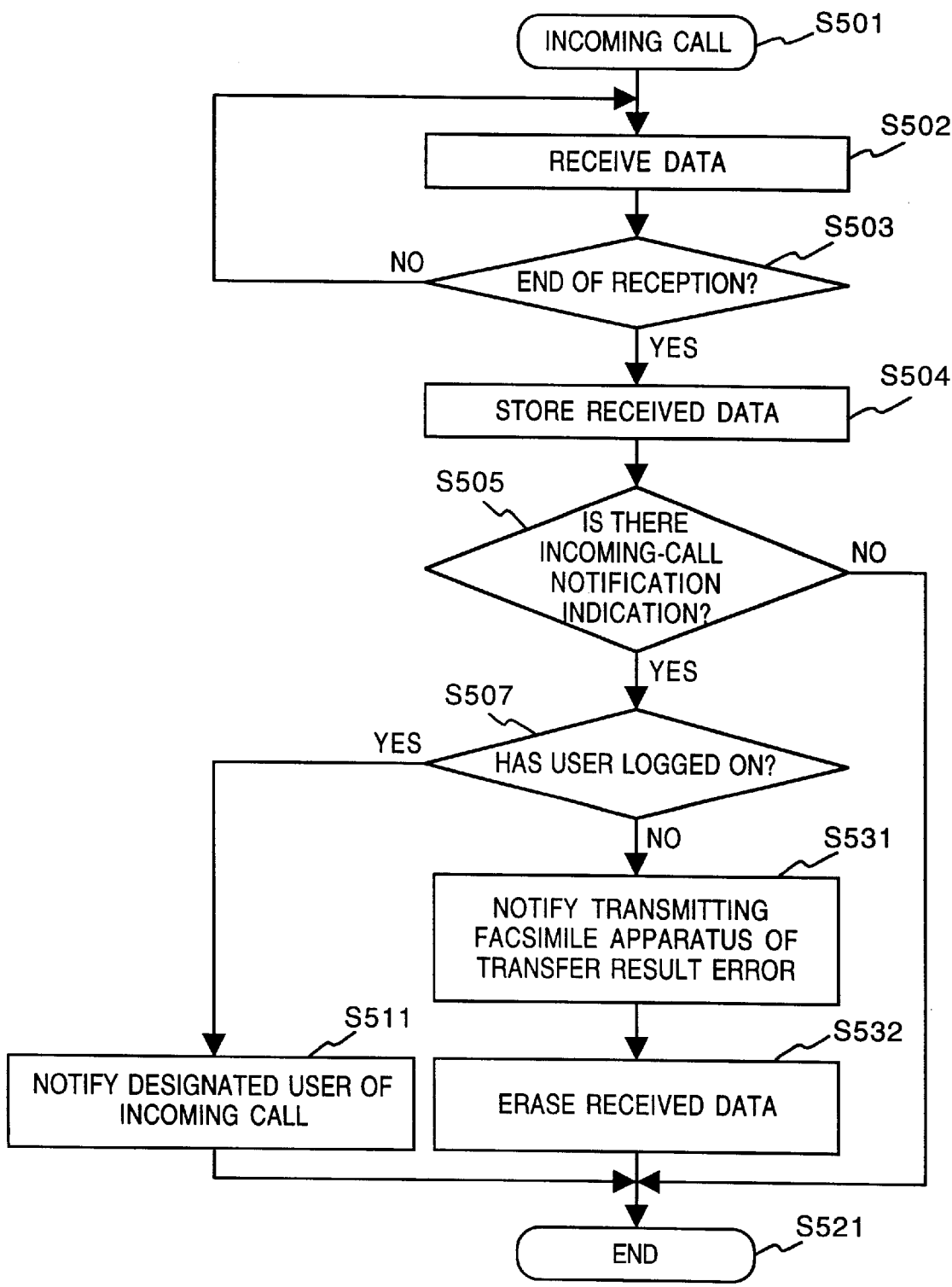
FIG. 8 is a flowchart showing a control procedure according to a third modification.

FIG. 8 is a flowchart showing a control procedure according to a third modification. This modification also illustrates a control procedure executed when an incoming call has been received from the communicating facsimile apparatus 208 via the line network 210. Steps in FIG. 8 identical with the steps shown in FIG. 5 are designated by like step numbers.

Specifically, at step S505, it is determined whether an indication to the effect that notification of the incoming call be sent to terminals on the LAN was received from the transmitting side at the time of data reception mentioned above. If there is no indication of the destination of the incoming-call notification ("NO" at step S505), then the program proceeds to step S521 and processing ends. If there is an indication of the destination of an incoming-call notification ("YES" at step S505), however, it is determined at step S507 whether the designated user name has logged on.

If the designated user name has logged on ("YES" at step S507), then the terminal at which the designated user has logged on is sent incoming-call notification mail containing a message indicating that FAX data have been received in an incoming call, e.g., a message reading "Data have been received from Mr. X" (step S511). Processing is then ended at step S521.

If it is found at step S507 that the user designated by the communicating facsimile apparatus 208 has not logged on ("NO" at step S507), then the program proceeds to step S531, where the communicating facsimile apparatus 208 is notified of a "transfer result error". This is followed by step S532, at which the image data that have been stored in the memory 104 are erased. Processing is then ended at step S521.

As described above, if the designated user has not logged on, the facsimile apparatus on the sending side is notified of a "transfer result error" and the accumulated image data are erased. As a result, the memory in the facsimile apparatus can be used more efficiently.

An arrangement may be adopted in which, in the processing from step S531 onward in FIG. 8, an inquiry is made of the communicating facsimile apparatus as to what measures should be taken after the above-mentioned notification has been received.

An example of a method of accomplishing this is as follows: Whether a proxy user has logged on is determined by referring to the allotter table shown in FIG. 4. If the proxy user has logged on, an inquiry is made as to whether notification of the incoming call is to be sent to this proxy user or whether the log-on of the designated user is to be checked again after waiting for a fixed period of time. Alternatively, an inquiry may be made as to whether notification of the incoming call should be printed out and whether the received data should be erased.

Further, an arrangement may be adopted in which a user who has been notified of an incoming call selects the above-mentioned measures in advance.

[Second Embodiment]

A second embodiment of the invention will now be described. A facsimile apparatus according to the second embodiment has the same construction as that of the first embodiment. These identical elements need not be described or illustrated again.

Figure 9A:
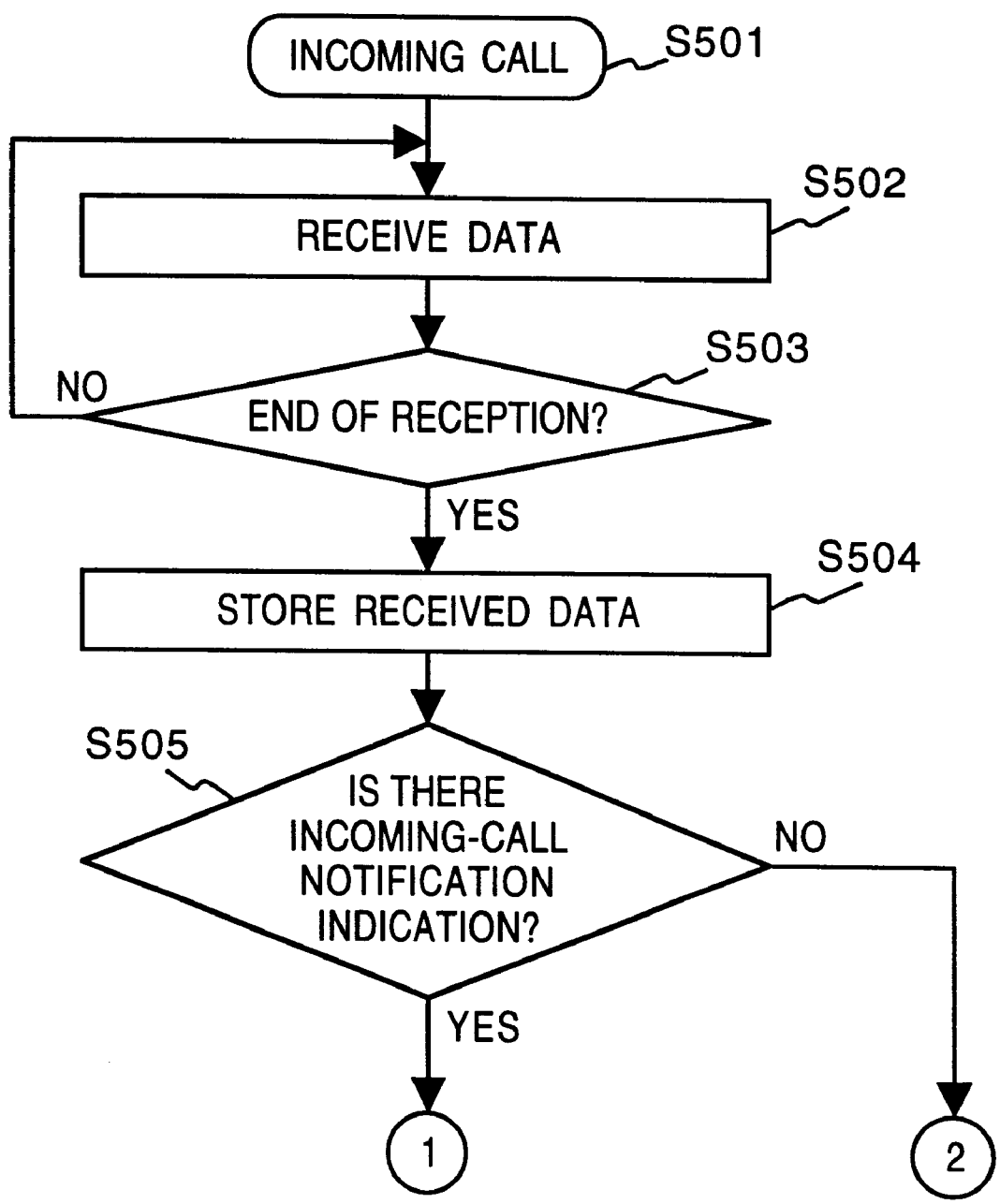

FIGS. 9A and 9B are flowcharts showing a reception control procedure according to the second embodiment of the invention. Steps in FIGS. 9A and 9B identical with the steps shown in FIG. 5 are designated by like step numbers.

Specifically, at step S505, it is determined whether an indication to the effect that notification of the incoming call be sent to a terminal on the LAN was received from the transmitting side at the time of data reception. If there is no indication of the destination of the incoming-call notification ("NO" at step S505), then the program proceeds to step S521 and processing ends. If there is an indication of the destination of an incoming-call notification ("YES" at step S505), however, it is determined at step S507 whether the designated user name has logged on.

If the designated user name has logged on ("YES" at step S507), then the terminal at which the designated user has logged on is sent incoming-call notification mail containing a message indicating that FAX data have been received in an incoming call, e.g., a message reading "Data have been received from Mr. X" (step S511). Processing is then ended at step S521.

If it is found at step S507 that the user designated by the communicating facsimile apparatus 208 has not logged on ("NO" at step S507), then the program proceeds to step S551. Here the facsimile apparatus 208 on the transmitting side is notified of "transfer result error" and an inquiry is made with regard to measures that should be taken subsequently. This is followed by step S552, at which it is determined whether the response to the inquiry made at step S551 is to transfer notification of the incoming call to the proxy user. If the response is that notification of the incoming call is to be transferred to the proxy user ("YES" at step S552), then the allotter table shown in FIG. 4 is referred to at step S506.

It is determined at step S508 whether the proxy user shown in FIG. 4 has logged on. If the proxy user has logged on, then notification of the incoming call is sent to the proxy user at step S509. However, if it is determined that the proxy user has not logged on ("NO" at step S508), then the program proceeds to step S531. Here the communicating facsimile apparatus 208 is notified of a "transfer result error". This is followed by step S532, at which the image data that have been stored in the memory 104 are erased. Processing is then ended at step S521.

If a "NO" decision is rendered at step S552, then it is determined at step S553 whether the response to the inquiry is to determine again, after a fixed period of time, whether the designated user has logged on. If the decision rendered at step S553 is "YES", then the system waits for a fixed period of time at step S515. This is followed by step S507, at which it is determined again whether the user designated by the communicating facsimile apparatus has logged on. If it cannot be confirmed that the user has logged on, step S515 is repeated. If log-on of the user can be confirmed, then the terminal at which the designated user has logged on is sent incoming-call notification mail containing a message indicating that FAX data have been received in an incoming call, e.g., a message reading "Data have been received from Mr. X" (step S511). Processing is then ended at step S521.

If it is found at step S553 that the response to the inquiry is not processing to determine, upon elapse of a fixed time, whether the user has logged on, then it is determined at step S554 whether the response to the inquiry is processing for outputting the incoming-call notification to the printer. If a "YES" decision is rendered here, then the notification of the incoming call is outputted to the printer. Specifically, a message such as "Data have been received from Mr. X" is outputted to the printer 115. Processing is then ended at step S521.

Thus, as described above, when a designated user has not logged on to the LAN, notification of a transfer result error is sent back to the facsimile apparatus on the transmitting side and an inquiry as to what measures should be taken subsequently is made of this facsimile apparatus. Depending upon the response to this inquiry, notification of an incoming call is transferred to the proxy user who has logged on or it is determined again, at fixed time intervals, whether the user has logged on. If the user has logged on, notification of the incoming call is transferred or printed out, or the received data are erased. By performing control in this manner, refusal of incoming calls can be avoided, thereby providing greater convenience for the user on the transmitting side.

In the second embodiment described above, it may be so arranged that a user who has been notified of an incoming call selects, in advance, the measures to be taken. Further, an arrangement may be adopted in which, when the measures are selected, the user assigns an order of priority to the measures, thus making it possible to execute a plurality of measures in accordance with the order of priority decided. Another measure, in addition to the above-described measures, is to make a selection in such a manner that received data are printed out.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus connected to a local area network including a plurality of communication terminals connected thereto, comprising:

means for receiving transmission data from a transmitter, the transmission data including data to be distributed to a communication terminal of the plurality of communication terminals connected to the local area network;

means for judging, based on the received transmission data sent from the transmitter, whether or not there is a receiving notification included in the transmission data;

means for performing a search to determine whether or not the communication terminal which is to receive the transmission data, has logged on to the local area network, when it is judged that the receiving notification is included in the transmission data;

means for pre-setting a proxy communication terminal corresponding to each of the plurality of communication terminals connected to the local area network at a receiver's side;

means for making an inquiry of the transmitter as to what action is to be taken to notify the communication terminal that the transmission data for distribution has been received, if the communication terminal, which is receive the transmission data, has not logged on; and means for processing the transmission data in accordance with the action to be taken, when the communication terminal which is to receive the transmission data, has not logged on to the local area network, wherein said means for processing the transmission data pre-sets the proxy communication terminal, corresponding to each of the plurality of communication terminals, as an object to be notified which is to receive the transmission data based on a response to the inquiry to the transmitter, and wherein the action to be taken, when a designated communication terminal is not logged on, is to notify the proxy communication terminal that transmission data exists for the designated communication terminal which is not logged on to the local area network.

2. The apparatus according to claim 1, further comprising means which, if the communication terminal has not logged on, re-determines, at fixed time intervals, whether the communication terminal has logged on, wherein the action to be taken is providing the receiving notification to the communication terminal after it has been determined that the communication terminal has logged on.

3. The apparatus according to claim 1, further comprising means which, if the communication terminal has not logged on, re-determines, at fixed time intervals, whether the proxy communication terminal has logged on, wherein the action to be taken is providing the receiving notification to the proxy communication terminal in a case where it has been determined that the proxy communication terminal has logged on.

4. The apparatus according to claim 1, further comprising means for printing an image indicating the transmission data from the transmitter as the action to be taken in a case where the communication terminal has not logged on.

5. The apparatus according to claim 1, further comprising means for erasing the transmission data from the transmitter as the action to be taken in a case where the communication terminal has not logged on.

6. The apparatus according to claim 1, wherein the action to be taken can be selectively designated in advance by a communication terminal that receives a receiving notification.

7. The apparatus according to claim 6, wherein when the action to be taken is designated, a degree of priority can be assigned thereto.

8. The apparatus according to claim 1, further comprising means for sending the receiving notification to a second plurality of communication terminals, irrespective of whether the communication terminal has logged on, as the action to be taken.

9. The apparatus according to claim 1, wherein the plurality of communication terminals and the communication apparatus are connected via a wire line that includes a public line.

10. The apparatus according to claim 1, wherein the plurality of the communication terminals and the communication apparatus are connected via a wireless link.

11. The apparatus according to claim 1, wherein the communication apparatus is a facsimile apparatus with a LAN interface.

12. The apparatus according to claim 1, further comprising means for returning an error notification to the transmitter if the communication terminal has not logged on, wherein the inquiry is made after the error notification is returned.

13. A communication method in a communication apparatus connected to a local area network including a plurality of communication terminals connected thereto, comprising the steps of:

receiving transmission data from a transmitter, the transmission data including data to be distributed to a communication terminal of the plurality of communication terminals connected to the local area network;

judging, based on the received transmission data sent from the transmitter, whether or not there is a receiving notification included in the transmission data;

performing a search to determine whether or not the communication terminal which is to receive the transmission data, has logged on to the local area network, when it is judged that the receiving notification is included in the transmission data;

means for pre-setting a proxy communication terminal corresponding to each of the plurality of communication terminals connected to the local area network at a receiver's side;

making an inquiry of the transmitter as to what action is to be taken to notify the communication terminal that the transmission data for distribution has been received, if the communication terminal which is to receive the transmission data has not logged on; and processing the transmission data in accordance with the action to be taken, when the communication terminal has not logged on to the local area network, wherein said step of processing the transmission data pre-sets the proxy communication terminal, corresponding to each of the plurality of communication terminals, as an object to be notified which is to receive the transmission data based on a response to the inquiry to the transmitter, and wherein the action to be taken, when a designated communication terminal is not logged on, is to notify the proxy communication terminal that transmission data exists for the designated communication terminal which is not logged on to the local area network.

14. The method according to claim 13, further comprising the step of, if the communication terminal has not logged on, re-determining, at fixed time intervals, whether the proxy communication terminal has logged on, wherein the action to be taken is providing the receiving notification to the proxy communication terminal in a case where it has been determined that the proxy communication terminal has logged on.

15. The method according to claim 13, further comprising the step of printing an image indicating the transmission data from the transmitter as the action to be taken in a case where the communication terminal has not logged on.

16. The method according to claim 13, further comprising the step of erasing the transmission data from the transmitter as the action to be taken in a case where the communication terminal has not logged on.

17. The method according to claim 13, wherein the action to be taken can be selectively designated in advance by a communication terminal that receives a receiving notification.

18. The method according to claim 17, wherein when the action to be taken is designated, a degree of priority can be assigned thereto.

19. The method according to claim 13, further comprising the step of sending the receiving notification to a second plurality of communication terminals, irrespective of whether the communication terminal has logged on, as the action to be taken.

20. The method according to claim 13, further comprising the step of, if the communication terminal has not logged on, re-determining, at fixed time intervals, whether the communication terminal has logged on, wherein the action to be taken is providing the receiving notification to the communication terminal after it has been determined that the communication terminal has logged on.

21. The method according to claim 13, further comprising the step of returning an error notification to the transmitter if the communication terminal has not logged on, wherein the inquiry is made after the error notification is returned.

22. A computer-readable storage medium storing a program for executing a communication method in a communication apparatus connected to a local area network including a plurality of communication terminals connected thereto, said method comprising the steps of:

receiving transmission data from a transmitter, the transmission data including data to be distributed to a communication terminal of the plurality of communication terminals connected to the local area network;

judging, based on the received transmission data sent from the transmitter, whether or not there is a receiving notification included in the transmission data;

performing a search to determine whether or not the communication terminal which is to receive the transmission data, has logged on to the local area network, when it is judged that the receiving notification is included in the transmission data;

pre-setting a proxy communication terminal corresponding to each of the plurality of communication terminals connected to the local area network at a receiver's side;

making an inquiry of the transmitter as to what action is to be taken to notify the communication terminal that the transmission data for distribution has been received, if the communication terminal which is to receive the transmission data, has not logged on; and processing the transmission data in accordance with the action to be taken, when the communication terminal, which is to receive the transmission data, has not logged on to the local area network, wherein said processing step pre-sets the proxy communication terminal, corresponding to each of the plurality of communication terminals, as an object to be notified which is to receive the transmission data based on a response to the inquiry to the transmitter, and wherein the action to be taken, when a designated communication terminal is not logged on, is to notify the proxy communication terminal that transmission data exists for the designated communication terminal which is not logged on to the local area network.

* * * * *